United States Patent [19]

Pence, Jr.

[11] 3,765,488

[45] Oct. 16, 1973

[54] WELL TREATING METHOD

[75] Inventor: Samuel E. Pence, Jr., Tulsa, Okla.

[73] Assignee: The Dow Chemical Company, Midland, Mich.

[22] Filed: Apr. 6, 1972

[21] Appl. No.: 241,816

[52] U.S. Cl. ............................................... 166/308
[51] Int. Cl. ............................................. E21b 43/26
[58] Field of Search ................. 166/308, 282, 307, 166/283, 305 R; 252/8.55 A

[56] References Cited
UNITED STATES PATENTS

| | | | |
|---|---|---|---|
| 3,108,636 | 10/1963 | Peterson | 166/308 |
| 3,310,112 | 3/1967 | Nielsen et al. | 166/280 |
| 3,368,627 | 2/1968 | Hurst et al. | 166/307 |
| 3,396,107 | 8/1968 | Hill | 166/308 X |
| 3,664,422 | 5/1972 | Bullen | 166/308 X |
| 3,696,035 | 10/1972 | Nimerick | 166/308 X |

*Primary Examiner*—Stephen J. Novosad
*Attorney*—William M. Yates

[57] ABSTRACT

Disclosed is a method of treating a subterranean formation penetrated by a wellbore. The method comprises injecting down the wellbore and subjecting to above atmospheric pressure an essentially anhydrous mixture comprising liquid carbon dioxide as a first component together with a second component of an alcohol gelled to a viscosity of at least 10 centipoise with a hydroxyalkyl cellulose. The alcohol is selected from those alcohols containing from 1 to 3 carbon atoms with the hydroxyalkyl cellulose being further defined in that it is substituted at the primary alcohol position with alkyls containing 3 or 4 carbon atoms.

12 Claims, No Drawings

WELL TREATING METHOD

BACKGROUND OF THE INVENTION

In many areas where oil and gas are produced, it is found that reservoirs tapped by wells possess only a limited productivity and that it is necessary in increase deliverability of the formation in order to provide economically feasible production. One method of increasing deliverability of the formation involves pumping a liquid down the wellbore and forcing it out into the formation by the exertion of hydraulic pressure, thereby "fracturing" the formation. A proppant, such as sand, is added to the fluid and carried into the formation fracture so when hydraulic pressure is released the sand will support the overburden of rock and leave a conductive lens deep into the rock matrix. Traditionally oil and water have been used as fracturing fluids. Peterson discloses in U.S. Pat. No. 3,108,636 the use of liquid carbon dioxide as the fracturing fluid. The use of liquid $CO_2$ as the fluid is advantageous because following injection it will vaporize at bottom hole temperatures with a subsequent pressure and volume increase, thus providing energy to return to the surface, and remove itself from the formation. This is in contrast to the cleanup job required after the use of conventional fluids which may take as long as several weeks.

The use of liquid $CO_2$ by itself presents two problems. The first is that it is not viscous enough to carry sand or other propping agent at feasible pumping rates. A second disadvantage lies in the fact that $CO_2$ has a rather low critical temperature, i.e., 88°F., which makes it impossible to maintain it in the liquid state in the warmer formations. The second problem has been solved by Hurst et al. who disclose in U.S. Pat. No. 3,368,627 a method of adjusting the critical temperature of $CO_2$ by mixing it with Liquid Petroleum Gas (LPG). Nielsen et al. report one method for dealing with the first problem in U.S. Pat. No. 3,310,112. They disclose the use of an organic liquid gelled with a natural or synthetic gum, e.g., guar gum or polyacrylamide, in admixture with liquid $CO_2$. This technique increases the viscosity of the fluid sufficiently to support sand or other propping agent when substantial amounts of water are present. However, the prior art does not disclose a method for combining a gelled hydrocarbon with liquid $CO_2$ in an essentially anhydrous (no more than 5 percent water) system. Since many formations, especially those for the production of natural gas, are damaged by the introduction of water, there is a need for such an essentially anhydrous system. Various gelled essentially anhydrous systems are known; however, the vast majority of such systems lose their viscosity when brought into contact with liquid $CO_2$.

Accordingly, it is an object of the present invention to provide a composition containing liquid $CO_2$ and a gelled organic fluid of sufficient viscosity to support a propping agent.

An additional object is to provide such a composition wherein the gelled organic fluid is compatible with the liquid $CO_2$ and mixtures of LPG and $CO_2$.

A further object is to provide such a composition which is essentially anhydrous in that it contains no more than 5 percent water.

Another object is to provide a method for treating an oil or gas bearing formation with a composition having the characteristics set out herein.

SUMMARY OF THE INVENTION

The present invention is a method of treating a subterranean formation penetrated by a wellbore. The method involves injecting into the wellbore and subjecting to above atmospheric pressure an essentially anhydrous fluid. The fluid comprises liquid carbon dioxide as a first component together with an alcohol gelled to a viscosity of at least 10 centipoise with a hydroxyalkyl cellulose as a second component. The alcohol contains from 1 to 3 carbon atoms and the hydroxyalkyl cellulose is further defined in that it is substituted at the primary alcohol position with alkyls containing 3 or 4 carbon atoms.

DESCRIPTION OF PREFERRED EMBODIMENTS

In a preferred embodiment of the invention the hydroxyalkyl cellulose has a molecular weight of from 50,000 to 1,500,000. The preferred cellulose derivative is hydroxypropyl cellulose with a molecular weight of from 8,000 to 1,000,000 being especially preferred. In determining molecular weight the method of viscosity or gel permeation chromatography is recommended.

Of the operable alcohols, methanol is preferred due to its favorable effect on the critical properties of the liquefied gases. In addition, the use of methanol as the gelled organic fluid is advantageous for the reason that methanol aids in dehydrating the producing formation and removing interstitial water. The use of methanol is also desirable for the role it plays in lowering the temperature at which solid gas hydrates form, thereby reducing the tendency toward plugging of the gas-producing equipment by such solid gas hydrates. Other alcohols such as ethanol, propanol and isopropanol may be employed when it is desirable to further increase the critical temperature of the liquified gases. In addition, Liquid Petroleum Gas (LPG) may be, and normally is, mixed with the liquid $CO_2$ to provide a mixture having a higher critical temperature than $CO_2$ alone. The relative proportions of LPG and $CO_2$ will normally vary from 5 to 95 percent mole fraction of each to make up a total of 100 percent. The amount of LPG to be blended with the $CO_2$ will vary depending on the critical properties desired. In artic regions where the bottom hole temperatures remains below 88°F. pure $CO_2$ will be satisfactory. In warmer regions, where bottom hole temperatures are such that it is difficult or impossible to maintain $CO_2$ in the liquid state, LPG will be blended in. The amount of LPG to be employed will depend on the critical properties desired and can be readily determined by the art skilled, cf. U.S. Pat. No. 3,368,627. In addition, the type and amount of alcohol used will have an effect on the critical properties of the composition. For example, it has been found that a 1:1:1 weight ratio mixture of $CO_2$:LPG:gelled methanol will have a critical temperature of about 15 percent higher than the $CO_2$/LPG mixture alone. Higher alcohols will raise the critical temperature even more provided they are employed in sufficiently high concentration.

Preferably the alcohol should be gelled to a viscosity of from 10 to 500 centipoise as determined by a Fann VG Meter, Model 35, RIBI, at 100 RPM (Shear Rate, 160 Sec.$^{-1}$).

The idealized structure of the cellulose derivatives which may be used to form the gel for use in the instant invention is:

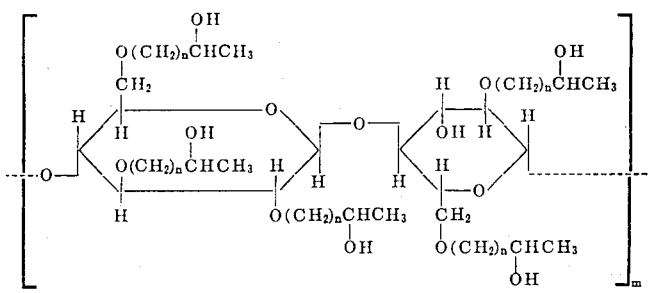

wherein $n$ is 1 or 2 and $m$ is a number representing the degree of polymerization which is sufficient to provide a polymer having a molecular weight of from 50,000 to 1,500,000. The polymer is normally terminated with —OH or an anhydroglucose unit. During preparation the secondary hydroxyl present in the side chain is available for further reaction with alkylene oxide so that some chaining out may take place.

The invention is further illustrated by the following examples.

EXAMPLE I

A gas bearing formation at a depth of 6,000 feet is penetrated by rotary drilling using methods designed to minimize damage to the formation. The producing interval was perforated in clean fluid and a small spearhead of acid forced into the formation. Then a mixture of liquid $C_2$ to $C_6$ hydrocarbons (LPG) and liquid $CO_2$ is pumped down the annulus between 2 inch tubing and the casing and on out into the formation. Next a mixture of 3 parts methanol and 1 part toluene by volume thickened with 75 pounds Klucel H (hydroxypropyl cellulose) per 1,000 gallons is injected at a rate and pressure sufficient to fracture the formation. The gelled alcohol has suspended in it sand in the amount of 1 pound per gallon. After injection, the well is closed to allow the injected fluids to approach static bottom hole temperature. Finally, the well head is opened and the residual fluids are forced back up the wellbore by the gas-drive energy provided by the liquefied gases which are now above their critical temperature and below their critical pressure. Clean-up, which is rapid because no water damage is done, is completed in a day rather than the weeks or months required with some methods.

EXAMPLE II

A gas well located in McCulloch Co., Texas have been completed with a 4 ½ inch casing to a depth of about 1,316 feet was treated by the process of the instant invention.

A sand carrying gel was prepared by gelling a 3:1 volume mixture of methanol and toluene with hydroxypropyl cellulose sold by Hercules, Inc. as Klucel H at a level of 80 pounds per 1,000 gallons. The gelling agent is a nonionic water soluble hydroxypropyl cellulose having a viscosity of 1,500 to 2,500 centipoise as a 1 percent solution in water. The material was supplied in 100 pound drums as a white granular solid, 95 percent passing 30 mesh and had a molecular weight of about 900,000. The mixing of the methanol, toluene and Klucel H resulted in a gel having a viscosity of about 180 cps. After gelling, 1 pound per gallon of 20/40 sand was blended into the gel.

Liquid Petroleum Gas and liquid $CO_2$ were blended in a 1:1 ratio at about 9 barrels per minute. The sand carrying gel and the liquefied gases were injected into separate openings of a cross valve in amounts sufficient to provide a ratio of gel:$CO_2$:LPG of 1:1:1. After a total of 4,500 gallons of fluid had been injected, sufficient pressure was applied to fracture the formation, i.e. 1,500 psi.

After sand had begun entering the formation a "screen out" occurred at which point the casing was vented to atmosphere and allowed to "clean up" or flow fluids and sand out of the casing. The treatment was then repeated using remaining materials, i.e. 7,500 gallons injected at about 11.6 barrels per minute at about 1,000 psi.

Initial flow tests after this treatment indicated an outstanding success. On 7 hours of flow testing, all returns were in the gaseous state with no propping agent removed while production was at a controlled rate of approximately 50 times that of pretreatment open flow. With previous water fracturing treatments in this shallow gas sand, even moderate production increases had been dificult to obtain.

I claim:

1. The method of treating a subterranean formation penetrated by a wellbore which comprises injecting down the wellbore and subjecting to above atmospheric pressure an essentially anhydrous mixture comprising liquid carbon dioxide as a first component together with a second component of an alcohol gelled to a viscosity of at least 10 centipoise with hydroxyalkyl cellulose said alcohol being further defined in that it contains from 1 to 3 carbon atoms and said hydroxyalkyl cellulose being further defined in that it is substituted at the primary alcohol position with alkyls containing 3 or 4 carbon atoms.

2. The method of claim 1 wherein the alcohol is gelled to a viscosity of from 10 to 500 centipoise.

3. The method of claim 1 wherein the hydroxyalkyl cellulose corresponds to the formula

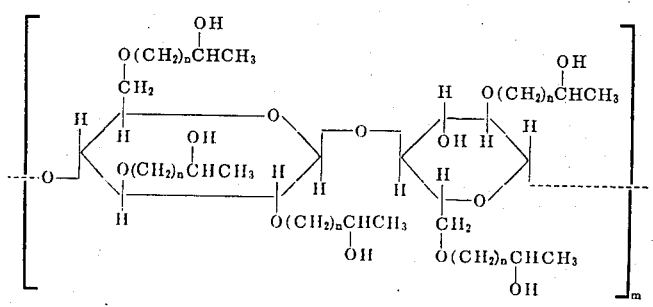

wherein $n$ is 1 or 2 and $m$ is a number representing the degree of polymerization sufficient to provide a polymer having a molecular weight of from 50,000 to 1,500,000.

4. The method of claim 3 wherein $n$ is 1 and $m$ is a number representing a degree of polymerization sufficient to provide a polymer having a molecular weight of from 800,000 to 1,000,000.

5. The method of claim 4 wherein the alcohol is methanol.

6. The method of claim 1 wherein the liquid $CO_2$ is combined with Liquid Petroleum Gas (LPG).

7. The method of claim 6 wherein the relative proportions of liquid $CO_2$ and LPG vary from 5 to 95 percent mole fraction of each to make up a total of 100 percent.

8. A method of fracturing a subterranean formation penetrated by a wellbore which comprises injecting down the wellbore and subjecting to fracturing pressure an essentially anhydrous mixture comprising liquid carbon dioxide as a first component together with a second component comprising methanol gelled to a viscosity of from 10 to 500 centipoise with hydroxypropyl cellulose having a molecular weight of from 50,000 to 1,500,000 and subsequently releasing such pressure.

9. The method of claim 8 wherein the hydroxypropyl cellulose has a molecular weight of from 800,000 to 1,000,000.

10. The method of claim 8 wherein the liquid $CO_2$ is combined with Liquid Petroleum Gas (LPG).

11. The method of claim 10 wherein the ratio of liquid $CO_2$/LPG/gelled methanol is 1:1:1.

12. The method of claim 8 wherein the subterranean formation is a gas well.

* * * * *

UNITED STATES PATENT OFFICE
CERTIFICATE OF CORRECTION

Patent No. 3,765,488          Dated October 16, 1973

Inventor(s) Samuel E. Pence, Jr.

It is certified that error appears in the above-identified patent and that said Letters Patent are hereby corrected as shown below:

Column 2, line 21, delete "8,000" and insert --800,000--.

Column 2, line 37, delete "liquified" and insert --liquefied--.

Column 2, line 46, delete "temperatures" and insert --temperature--.

Column 3, line 60, delete "have" and insert --having--.

Signed and sealed this 23rd day of July 1974.

(SEAL)
Attest:

McCOY M. GIBSON, JR.
Attesting Officer

C. MARSHALL DANN
Commissioner of Patents